United States Patent [19]

Evans et al.

[11] Patent Number: 5,015,383

[45] Date of Patent: May 14, 1991

[54] SLOTTED SCREEN SCALLOPS FOR HIGH LOADING PRESSURES AND METHOD OF MAKING SAME

[75] Inventors: Thomas W. Evans, Houston, Tex.; Robert G. Norell, New Brighton, Minn.; Stephen A. Uban, Stillwater, Minn.; Richard C. Maxson, Maple Grove, Minn.

[73] Assignee: Johnson Filtration Systems Inc., New Brighton, Minn.

[21] Appl. No.: 366,872

[22] Filed: Jun. 15, 1989

[51] Int. Cl.⁵ .............................................. B01D 29/00
[52] U.S. Cl. .................... 210/497.1; 29/163.7; 29/163.8; 55/526; 72/367; 100/295; 210/499
[58] Field of Search ............... 29/163.6, 163.7, 163.8; 210/497.01, 497.1, 498, 499; 422/216, 218; 228/173.4, 35; 100/295; 72/367, 412, 413; 55/526, 525

[56] References Cited

U.S. PATENT DOCUMENTS

| | | | |
|---|---|---|---|
| 828,715 | 8/1906 | Cook | 210/499 |
| 2,046,458 | 7/1936 | Johnson | 166/8 |
| 2,683,654 | 7/1954 | Bergman | 422/218 |
| 3,247,971 | 4/1966 | Kastler | 210/291 |
| 3,257,836 | 6/1966 | Huet | 72/412 |
| 3,520,418 | 7/1970 | Guinard | 29/163.6 |
| 3,708,848 | 1/1973 | Guinard | 29/163.8 |
| 4,013,556 | 3/1977 | Evans | 210/136 |
| 4,096,911 | 6/1978 | Geske | 166/234 |
| 4,098,695 | 7/1978 | Novotny | 210/85 |
| 4,276,265 | 6/1981 | Gillespie | 210/497.01 |
| 4,331,542 | 5/1982 | Emrie | 210/794 |
| 4,374,095 | 2/1983 | Legg et al. | 422/218 |
| 4,423,674 | 1/1984 | Thies | 100/295 |
| 4,818,403 | 4/1989 | Nagaoka | 210/499 |
| 4,930,331 | 6/1990 | Manning | 72/367 |

FOREIGN PATENT DOCUMENTS

| | | | |
|---|---|---|---|
| 158873 | 9/1954 | Australia | 210/499 |
| 222702 | 7/1959 | Australia | 210/499 |
| 513638 | 9/1952 | Belgium | 210/499 |
| 244315 | 12/1985 | Japan | 210/497.01 |
| 227526 | 10/1987 | Japan | 72/367 |

OTHER PUBLICATIONS

Article in "Machinery", vol. 142, Jul. 1944, Lockheed.

Primary Examiner—Robert A. Dawson
Assistant Examiner—Joseph Drodge
Attorney, Agent, or Firm—Barry L. Clark

[57] ABSTRACT

An elongated screen assembly, which in various forms, is useful as a scallop in a reactor, or as an underdrain for a gravity filter system, has a cross-section in a direction normal to its axis which is at least twice as wide as it is high. A method is also disclosed for manufacturing the screen assembly by pressing the opposed sides of a wrapped wire cylindrical screen assembly between a pair of plates which have radii of curvature which are different from each other and greater than the radius of curvature of the cylindrical screen assembly.

8 Claims, 2 Drawing Sheets

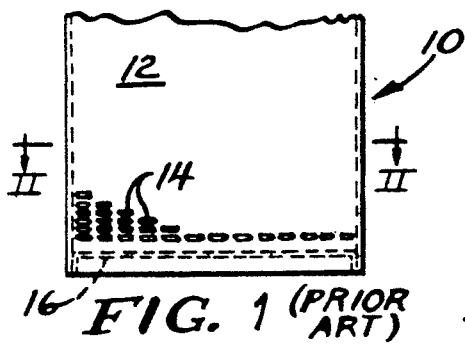
FIG. 1 (PRIOR ART)
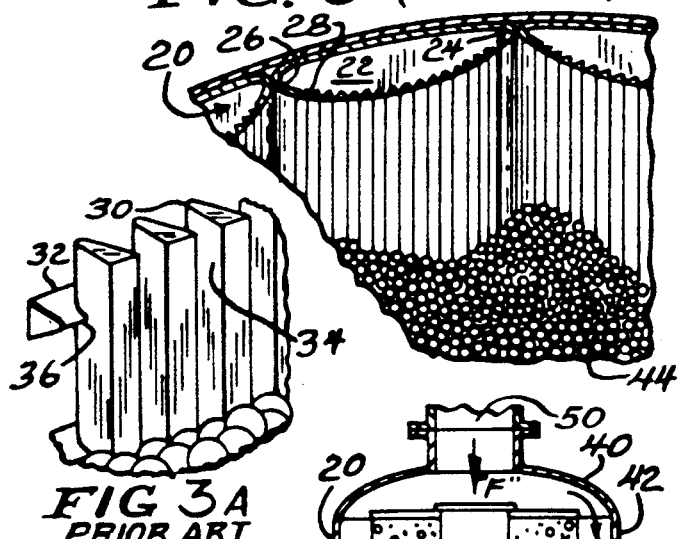
FIG. 3 (PRIOR ART)
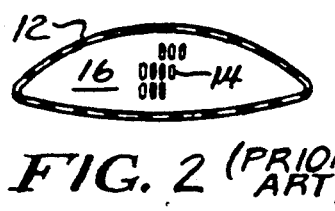
FIG. 2 (PRIOR ART)
FIG 3A (PRIOR ART)
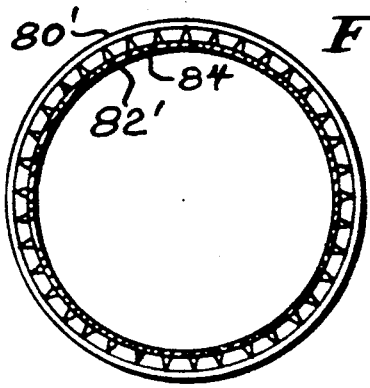
FIG. 8
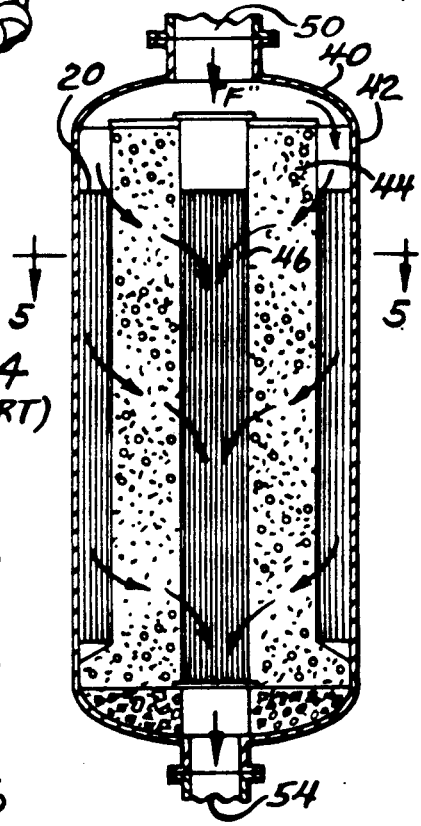
FIG. 4 (PRIOR ART)
FIG. 9
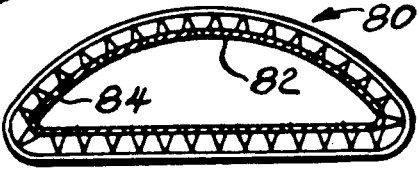
FIG. 6A
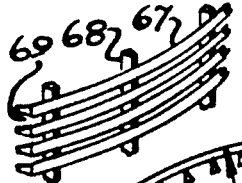
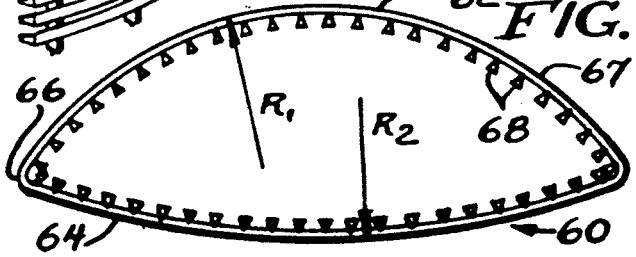
FIG. 6
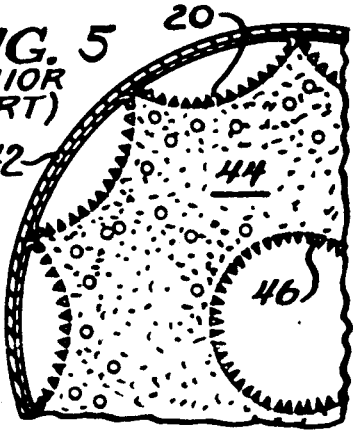
FIG. 5 (PRIOR ART)
FIG. 7
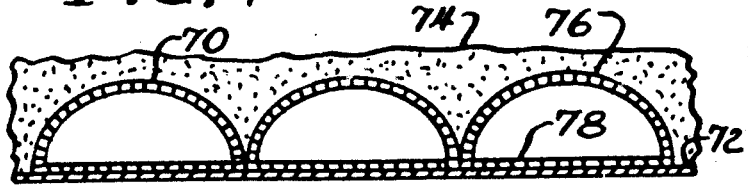

SLOTTED SCREEN SCALLOPS FOR HIGH LOADING PRESSURES AND METHOD OF MAKING SAME

BACKGROUND OF THE INVENTION

The invention relates to screens, and especially to generally tubular, but non-cylindrical, hollow screen members which include an elongated, curved surface which is perforated, slotted, or has some other form of partially open filtering surface, and which has sufficient strength to resist the external forces which might be applied to it, such as by a bed of particulate material, for example. One prior art example of such a screen, which is adapted to be used in a vertical arrangement inside a reactor vessel, comprises a plurality of scallop elements which are adapted to be arranged around the inside of the outer wall of the reactor vessel. In such a vessel, a generally annular bed of catalyst might be positioned between the radially inwardly facing partially open surfaces of the plurality of scallops and a cylindrical, perforated inner screen member. The scallop members and the inner screen are collectively referred to as the "internals" of the reactor. In operation, a reactant gas entering, for example, the open upper ends of the scallops, would first pass radially inwardly through the openings formed in the inner wall surfaces of the scallops and would then pass radially inwardly through the catalyst, through the perforated outer surface of the inner screen member, and then exit through the bottom end of the inner screen member. Although the fluid in a reactor type of scallops installation is typically a gas, it could also be a liquid.

Typically, screen members of the type hereinbefore described are produced by punching a large plurality of small oblong slots into a sheet of metal which is then formed and welded into the desired generally tubular shape. The perforations are usually limited to one side of the screen, with the opposite side being unperforated. Although strength requirements often dictate a certain minimum thickness of metal be used for a screen, there appear to be certain physical limits as to how narrow a slot can be punched in a sheet of a given thickness. For example, it has been found to be quite difficult from a technological standpoint to produce slots narrower than about 0.042" in a sheet of stainless steel having a thickness of about 0.048". Also, the open area of such a screen is relatively low, about 26%, as compared to some other types of screens such as, for example, the cylindrical water well screens shown in U.S. Pat. No. 2,046,458 issued to E. E. Johnson. The type of screen shown in the aforementioned Johnson patent is typically produced by helically wrapping an elongated strand of wire having a wedge or keystone-shaped cross-section around the circumference of a plurality of circumferentially spaced, longitudinally extending internal support rods. The wrap wire is typically welded at every intersection with said rods to establish the spacing or width of the slots which are formed between adjacent wraps of wire. The slot spacing of the aforementioned wrapped welded wire screens, and thus the open area of the screen, can be readily varied by varying the rate at which the rods are advanced for each revolution of the cylinder.

Screens of the aforementioned wrapped wire type are preferably formed as a cylinder, whereas scallops must typically be formed so as to have a non-cylindrical shape including a pair of opposed, outwardly convex surfaces. Although it has been possible, in the manufacture of scallops, to take advantage of the finer slot sizes, which can be as small as 0.001", and greater open area which are available with wrapped wire screens, it has been necessary to use quite expensive fabricating techniques in order to achieve a satisfactory scallop assembly. For example, to produce such a scallop assembly, a wrapped wire screen cylinder is longitudinally split and then flattened sufficiently to produce a curved panel of the desired radius of curvature for the perforated side of the scallop assembly. A flat sheet of metal, usually stainless steel, is then curved to the desired radius of the back surface of the scallop and its two side edges are bent toward each other rather sharply so as to project forwardly in the curved plane of the partially flattened slotted screen panel. The metal sheet is then welded along its side edges to the screen panel so as to produce a composite screen assembly in which the bent side edges of the metal sheet overlap the edges of the screen panel. The resulting screen assembly is generally satisfactory but is far more costly to produce than a scallop assembly formed solely from a perforated sheet.

During normal, low pressure drop operation of a particular catalyst regenerating vessel, perforated plate type scallops are generally sufficient. However, heat-up and cool-down of the vessel can cause significant short-term loading on the internals, including the scallops. High loadings can also be generated by operation beyond normal regeneration requirements, fouling of the catalyst bed, high local temperatures and carbon clinker growth within the bed. These severe conditions require stronger internals with design variability to meet the operating conditions seen in specific units.

Perforated scallops in reformer service have open area and strength limitations. As previously noted, the sheet thickness of the formed metal scallop is limited by the size and number of perforations which it is physically practical to punch in the sheet. Openings in the form of $0.042'' \times \frac{1}{2}''$ oblong slots in 0.048" thick material is stretching the normal industry practice of minimum opening size equal to material thickness. A punched hole size of 0.042" is generally considered to be the largest sized opening that can be used to safely retain a conventional 0.062" diameter catalyst. This maximum width opening effectively defines the maximum thickness of material used to make the scallop and, therefore, the greatest strength for the scallop. Almost no alternatives to this sheet thickness/perforation size limitation are available within punched sheet technology. Thus, a punched sheet scallop is limited in collapse strength, open area, and vertical load component strength because the sheet thickness is defined. Attempts at reinforcing perforated scallops have been made via internal stiffeners and heavier gauge backs welded to 0.048" thick fronts. The use of such stiffeners does not, however, necessarily increase the strength of the scallop. This is because the loading imposed on the scallop face by a catalyst bed is typically not in uniform hydraulic directions. Rather, the granular bed imposes more of a straight line load. Under high loading, the back surface of a scallop will initially straighten out sufficiently that it will seat completely on the curved vessel wall. At that time, a classic arch is formed, which, under load, fails in buckling at a definable point. Adding a vertical stiffening rib at the center actually reduces the collapse strength by inducing the buckling mode. The stiffener does not allow a true arch to form, thus severely weakening the ability of the scallop to resist collapse. The stiffener does, however, increase longitudinal stiffness for ease of handling.

In addition to the aforementioned cylindrical and flattened screen members which have been discussed as having been used in vertical arrangements, there are various types of screens which have been used in horizontal arrangements, such as underdrains for gravity or pressure filters. Some of these, such as the arrangement shown in Kastler U.S. Pat. No. 3,247,971, include quite wide slots which can only be used with a coarse filter media, or which would require successive layers of media having various degrees of coarseness. A generally flat arrangement, such as disclosed in Emrie U.S. Pat. No. 4,331,542 must be attached to the floor of the filter chamber. Evans U.S. Pat. No. 4,098,695 and Novotny U.S. Pat. No. 4,098,695 each show horizontal distributor/collector arrangements having cylindrical screen laterals with internal piping which has a smaller open flow area than that of the screen surface so that back pressures can be provided during backwashing that will assure relatively uniform distribution of the backwashing fluid to those portions of the media bed which are above the laterals. Because the laterals in arrangements such as those shown by U.S. Pat. No. 4,013,556 and 4,331,542 are somewhat widely spaced from each other, it is obvious that a backwashing operation will not be able to contact the media which is located near the bottom of the filter bed and between the laterals as well as it does the media immediately above a lateral. One could consider greatly multiplying the number of laterals but this would not generally be feasible from an economic standpoint.

SUMMARY OF THE INVENTION

It is among the objects of the present invention to provide a tubular perforated screen member which, when formed in a scallop shape, can have lesser or greater strength characteristics compared to prior art scallops formed from perforated metal, while offering the possibility of narrower perforations of a width which have previously only been available from composite screen assemblies in which a slotted screen is welded to a sheet metal back. Another object is to provide a scallop shaped screen member which can be produced much more simply and at less cost than prior art scallops. A still further object is to provide a tubular perforated screen member which has a scallop shape or is otherwise of much greater dimension in one direction than in another and which includes an internal tubular member which has flow openings therein having an open area less than that of the screen member. Yet another object is to provide a method for producing a scallop or other similarly shaped tubular member solely from a length of wire wrapped screen.

The foregoing and other objects and advantages are attained by the article and method of the present invention in which a scallop or similar perforated tubular article is produced by deforming a cylindrical or other tubular-shaped screen member or assembly, and preferably one which has previously been formed by helically wrapping an elongated profile wire about a plurality of support members and welding the wire to the support members at every intersection. More specifically, it is preferred that the opposed sides of the screen be compressed and shaped between a pair of forming dies in a press brake.

A screen member or assembly which is press-formed into a scallop or other flattened shape in accordance with the present invention can provide significant advantages at a cost which is generally less than or equal to the cost of scallops of the perforated plate type. For example, from a process standpoint, the use of press-formed scallops in a reactor vessel can provide: Lower system operating cost due to reduced pressure drop at the catalyst interface; Smaller slot openings, but more of them, so as to provide a greater total open area, thus reducing system pressure drop, and therefore, cost; Ventilation of the back sides of the scallops so as to avoid system hot spots and dead areas. From a function standpoint, a screen scallop in accordance with the present invention can provide the following advantages: Since it can have smaller slot openings and greater strength, more positive retention of expensive noble metal base catalyst will be provided; Greater percent open area and net open area are available due to the narrower face width of screen wire; The slots are continuous and thus do not have the intermittent blockages to flow found with punched slots; Perforated plate scallop open area is typically limited to about 26 percent whereas screen type scallops can provide open areas ranging from 58 percent where a narrow width wrap wire is used (about 0.030" wide) to about 18 percent where a heavy wire is used (about 0.130" wide), and even less when the width of the screen slot is reduced; By changing wire sizes, the screen type scallop can be tailored, so as to have a defined strength, allowing a certain amount of scallop deflection in the radial direction before the catalyst is crushed. Many wire shape selections allow the design to match specific crushing characteristics of the catalyst used. The strength of the screen scallop can vary from about ½ to 100 times the strength of a perforated plate type scallop. Although a stronger scallop would normally be desired, a screen having only half the strength of a perforated screen may be useful for a situation of severe catalyst bridging between scallop and centerpipe. For example, very high loads can be generated in a reactor during heat-up and cool-down to ambient temperatures which can result in collapse of the centerpipe. To counteract such loads, a very resilient scallop could be designed that will deform or deflect easily, thereby reducing collapse pressure on the centerpipe. Such a screen scallop could be made with extra longitudinal rods that provide column strength and high resiliency. Deflection would be controlled by wire size. Higher section modulus wires would deflect less than low section modulus wires. Alternate means would be stiffeners inserted inside of the scallop. Since deflection of a scallop beyond its elastic limit would collapse it, the amount of deflection permitted should be enough to unload the centerpipe but not so much as to collapse it permanently. Typically, the scallop deflects and then resumes its normal shape when the load is removed.

A modification of the improved scallop relates to flow distribution. Normally, in a reactor, the centerpipe is used to control the flow via a perforated hole pattern which contains less open area than the scallops. We have found that the flow distribution can be improved by forming a modified scallop from an assembly which initially comprises a perforated cylindrical liner placed inside a cylindrical screen. The perforated liner would be deformed to the same shape as the surrounding screen when the screen is pressed into its scallop shape. The modified scallop can provide the same distribution at lower pressure drop as compared to the arrangement incorporating a centerpipe since the flow holes would be spread over a larger area proportional to the vessel diameter rather than a small area proportional to the centerpipe diameter. Distribution would also be more uniform when controlled at the outlet surface rather than the inlet.

Additional modifications relate to the use of horizontally disposed screen members as gravity or pressure filter underdrains in a filter bed. The screen members would typically have a generally convexly curved top surface, a generally flat bottom surface, and widths which are at least double their height. They would also include an internal distribution means having an open area for flow smaller than the open area of the surrounding screen member. Such flattened screen members would thus cover a far greater horizontal area at the bottom of a filter bed than would be the case with a like number of cylindrical screens. The use of flattened screens would also ensure much more uniform backwashing of the media bed above the screens than would cylindrical screens, especially when the media bed is relatively shallow. The internal distribution means could take many forms, including, but not not limited to, drilled metal or plastic pipe, a pre-punched or drilled sheet metal cylinder, a triangular shaped tube or multiple pipes, for example. The fact that the distribution members have smaller open areas than the screen members which surround them means that backwash flows will be distributed evenly throughout the filter bed. They also ensure that flows downwardly through the filter bed will be more uniform.

BRIEF DESCRIPTION OF THE DRAWINGS

FIG. 1 is a fragmentary side elevation of a prior art scallop made from a perforated plate;

FIG. 2 is a cross-sectional view taken on line 2—2 of FIG. 1;

FIG. 3 is a framentary perspective view of a prior art scallop made from a segment of wrapped wire screen welded to a pre-formed backup plate;

FIG. 3-A is an enlarged view of a portion of FIG. 3;

FIG. 4 is a schematic vertical cross-section of a prior art reactor vessel which has a plurality of scallop members positioned around its inner periphery;

FIG. 5 is a partial cross-section taken on line 5—5 of FIG. 4;

FIG. 6 is a cross-section taken in a direction normal to the axis of a scallop-shaped screen member formed in accordance with the teachings of the present invention;

FIG. 6-A is a fragmentary enlarged perspective view of a portion of one of the curved side portions shown in FIG. 6;

FIG. 7 is a cross-section showing an embodiment in which a plurality of screen segments are arranged in a horizontal configuration;

FIG. 8 is a cross-section showing a cylindrical screen having a perforated cylindrical insert;

FIG. 9 is a cross-section showing the assembly of FIG. 8 after is has been deformed in accordance with the teachings of the present invention;

DETAILED DESCRIPTION OF THE DRAWINGS

Figure 10:
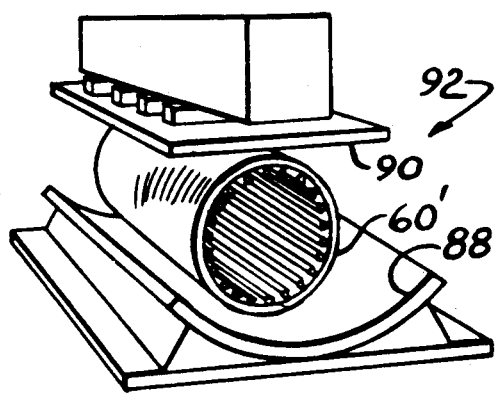
FIG. 10 is a perspective view illustrating the relationship between a cylindrical section of screen and a pair of plates which may be pressed against it to form a screen in accordance with the teachings of the present invention.
Figure 11:
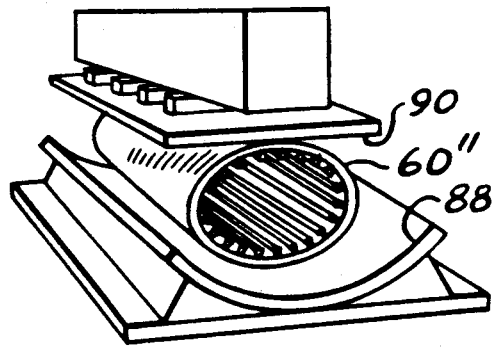
FIG. 11 is a perspective view illustrating the configuration of the formerly cylindrical section of screen of FIG. 10 after the pair of plates have been moved partially towards each other.
Figure 12:
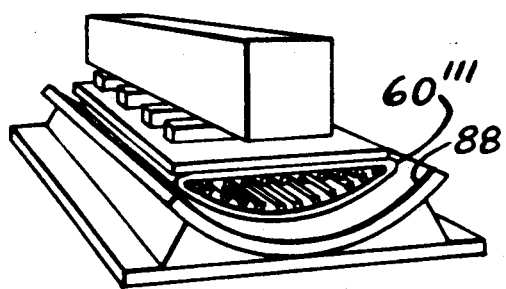
FIG. 12 is a perspective view illustrating the compressed configuration of the formerly cylindrical section of screen of FIG. 10 after the pair of plates have been moved to their closest position adjacent each other.

FIGS. 1 and 2 are side and cross-sectional views, respectively, of a prior art type of scallop assembly 10 which includes a perforated sheet member 12 having oblong punched-out perforations 14, and which is formed into the cross-sectional shape shown in FIG. 2. The assembly is shown as having a bottom portion 16 which contains similarly formed perforations 14. As previously mentioned, the smallest dimension of the punched-out perforations can generally be only very slightly less than the thickness of the material, due to metalworking limitations. For example, if required strength specifications dictate use of metal having a thickness of 0.048", it is known that the width of the perforations cannot normally be less than about 0.042". However, to prevent the loss of valuable catalyst, with which the scallops would be typically used, scallops of the configuration shown at 20 in FIG. 3 have been proposed and used. The scallop 20 consists of an unperforated metal backup plate portion 22 which is folded in a relatively small radius 24 at each edge so as to terminate in elongated end portions 26 which overlap, and are welded to, a curved welded wire screen member portion 28. Typically, the screen member portion 28 is formed as shown in FIG. 3-A by helically wrapping a wire 30 about a plurality of circumferentially arranged support rod portions 32. The wire is wound at a pitch which will provide flow slots 34 having a sufficiently narrow width to retain the catalyst but sufficiently large as to achieve a desired percentage of open area. As the wire 30 is wrapped around the support rod portions, it is welded thereto at every intersection 36. The resulting cylindrical screen is then cut, flattened, and re-formed into the curved shaped 28 shown. Although this manufacturing technique is quite expensive, it has allowed the formation of slot widths 34 for flow which are much smaller for a given strength of screen than is possible with the perforated plate type of scallop 10 shown in FIGS. 1 and 2.

A typical prior art vessel 40 into which scallops 20 of the type illustrated in FIG. 3 might be placed, is illustrated in FIGS. 4 and 5. The scallops 20 are placed around the outer periphery of the inside of the vessel wall 42 and are separated by a bed of catalyst 44 from a cylindrical inner screen member 46. In use, a fluid "F" to be treated, usually a gas, flows through the vessel inlet pipe 50 and then down through the open ends of the scallop members 20. The fluid exits the scallops radially inwardly through the narrow slots 34 (FIG. 3-A) and passes through the catalyst 44 into the inner screen or centerpipe member 46 from which it exits through the vessel outlet pipe 54.

The screen member 60 illustrated in cross-section in FIG. 6 is representative of the construction which can be achieved with the use of our improved method for forming non-circular screens shown in FIGS. 10-13. The screen 60 is characterized by the fact that it is integral and does not require the expensive forming and welding operations required to achieve the prior art scallop assembly 20 shown in FIG. 3. As can be seen, the screen 60 has two elongated convexly curved sides 62 and 64 having different, but relatively large radii, $R_1$ and $R_2$, which produce opposed, outwardly convex surfaces which are joined at their ends 66 by a a very short curved section having a relatively small radii. The wrap wire 67 is welded to the support rods 68 to provide flow slots 69 (FIG. 6-A) in the manner previously discussed in connection with the description of the making of the scallop member 20 shown in FIGS. 3 and 3-A.

FIG. 7 illustrates a slightly different shape of screen 70 which is adapted for horizontal use, such as on the bottom surface 72 of a bed of filter media 74. In this configuration, the upper surface 76 of the screen is curved so as to resist the forces exerted on it by the weight of the filter media 74 while the lower surface 78 has a radius of curvature which is very large, and which might even approach infinity. Preferably, the lower surface 78 is somewhat curved when the screen is formed and becomes flat when the weight of the filter media 74 is placed upon it.

FIG. 8 is a transverse cross-section of a cylindrical screen 80' into which a distribution member in the shape of a cylindrical liner member 82' containing perforations 84 has been placed. Preferably, the surface open area of the perforations 84 in the inner liner member is less than that of the outer screen member 80'. The resultant assembly can then be deformed to a generally flattened shape 80, such as that shown in FIG. 9, to provide a structure which can be used in situations wherein internal flow distribution members are required. One such situation would be as an underdrain system for a filter bed wherein the back pressure introduced by the smaller open area of the internal liner member 82 would provide both more uniform collection from throughout the media bed (not shown), and also more uniform cleaning of the media bed when water is forced into the liner member 82 to backwash the media bed.

Figure 13:
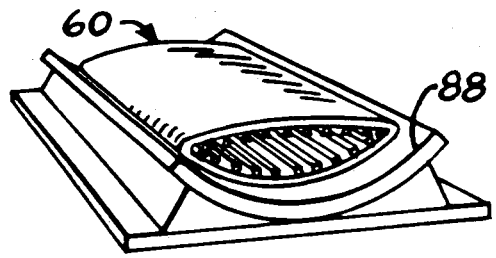
FIG. 13 is a perspective view illustrating the final unstressed configuration of the formerly cylindrical section of screen of FIG. 10 after the pair of plates have been moved out of contact with the formed screen section so as to release the pressure applied to the screen section.

FIGS. 10-13 illustrate the progression of steps by which the screen of the invention may be produced. Preferably, the screen 60 which is shown in FIGS. 6 and 13, is produced between a curved lower die member 88 and a flat or slightly curved upper die member 90 in a press brake apparatus indicated generally at 92. The screen starts out in the form of a cylinder 60' and is progressively deformed between the die members 88, 90 to a slightly flattened shape 60'' shown in FIG. 11 and then to its fully deformed shape 60''' shown in FIG. 12. Depending upon the resiliency of the material used for the wrap wire 67 and the support rods 68, the final, unstressed shape of the screen 60 shown in FIG. 13 will have radii of curvature of its sides which are varying degrees less than the radii of curvature shown in FIG. 12 where the screen 60''' is still engaged by the forming dies 88, 90. Although reference has been made to the radius of curvature of the sides of the screen 60, it is obvious that the sides do not have to have a constant radius of curvature. Rather, they can have various curved shapes, such as elliptical, hyperbolic or parabolic, which might better resist a particular loading to which they might be subjected during use. In addition, one of the surfaces could be flat where the resulting screen is to be used as an underdrain in a gravity filter bed.

Figure 14:
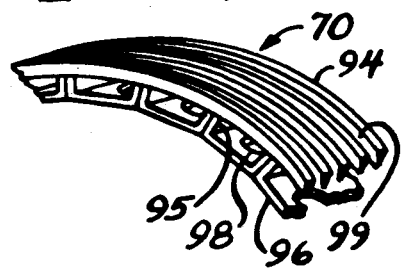
FIG. 14 is an enlarged perspective view illustrating a portion of the scallop configuration of FIG. 7 in which the internal support members comprise perforated channel members.

FIG. 14 is an enlarged fragmentary perspective view illustrating the construction of the flattened screen 70 in FIG. 7 in which the wrap wire 94 is welded to the leg portions 95 of elongated channel-shaped support members 96. Perforations 98 which are pre-formed in the support members have an open area which is less than the open area defined by the screen slots 99 and permit the support members to perform the additional function of flow distribution. The construction of a cylindrical screen of the type which would be flattened to form screen 70 is described in more detail in Geske U.S. Pat. No. 4,096,911.

Figure 15:
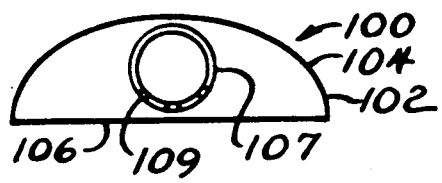
FIG. 15 is a cross-section of a scallop-shaped underdrain assembly containing a single perforated internal distribution pipe.
Figure 16:
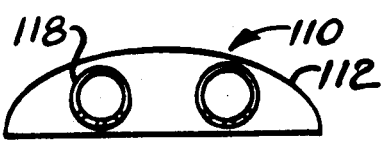
FIG. 16 is a cross-section of a scallop-shaped underdrain assembly containing a pair of perforated internal distribution pipes.
Figure 17:
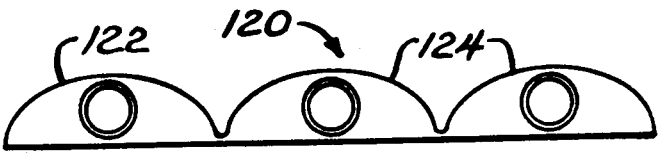
FIG. 17 is a cross-section of a scallop-shaped underdrain assembly having three curved segments and three perforated internal distribution pipes.

FIGS. 15-17 illustrate three underdrain assemblies. In FIG. 15, the underdrain assembly 100 includes a screen portion 102 with a curved upper surface 104, a flat bottom 106 and a single internal distributor pipe 107 which has a cylindrical shape. The pipe 107 includes perforations 109 which have an open area less than the open area of the screen upper surface 104. Preferable, the perforations 109 are located on the underside of the pipe 107 in order to cause backwash flows in the pipe to be distributed uniformly to all portions of the screen surface 104. FIG. 16 shows an underdrain assembly 110 which is generally identical to that shown in FIG. 15 except for having a pair of internal distributor pipes 118. One advantage of using multiple pipes 118 is that the pipes can be of smaller diameter than when a single pipe is used. Thus, a screen portion 112 having a lesser height than the screen 102 could be used in a situation where the allowable height of the bed of filter media is quite limited. FIG. 17 shows an underdrain assembly 120 in which the screen portion 122 is formed so as to provide a plurality of upwardly curved surfaces 124 in order to enhance the degree of horizontal coverage of a filter bed by a single screen member.

We claim:

1. A generally tubular, elongated screen assembly comprising an elongated, slotted portion which is formed solely of a welded integral assembly of a length of wire helically wrapped and welded to each of a plurality of longitudinally extending support members at every intersection therewith, said wire being helically wrapped at a pitch which defines a generally uniform maximum spacing between adjacent wraps of wire along the entire length of said wire and the entire length of said slotted portion, said slotted portion having a cross-section normal to its axis which is at least twice as wide in one direction as it is in a direction normal to said one direction, and which includes a pair of elongated, opposed sides which face each other and are formed of two different, and relatively large radii, said pair of sides being joined at their ends by curved end portions which are of a much smaller radii than either of said opposed sides.

2. A screen assembly in accordance with claim 1 wherein each of said pair of opposed sides has a convex outer surface.

3. A screen assembly in accordance with claim 1 wherein a distribution means is positioned inside said assembly, said distribution means containing a plurality of flow openings therein which have a total open flow area which is less than the total open flow area of the screen assembly.

4. A screen assembly in accordance with claim 3 wherein said distribution means comprises a generally tubular perforated sheet member which has the same cross-sectional configuration as the screen assembly.

5. A screen assembly in accordance with claim 1 wherein said longitudinally extending support members comprise channels whose leg portions are welded at their outer edges to said wire, and whose base portion is spaced by said leg portions from said wire, said base portions of said channels containing apertures which have a total open area which is less than the total open flow area of the screen assembly.

6. A screen assembly in accordance with claim 2 wherein said assembly has a scallop shape and is closed at one end and open at the other, one of said convex sides having a radius of curvature substantially equal to the radius of curvature of the inner wall of a reactor vessel in which it is adapted to be mounted, and the other side having a smaller radius of curvature, said assembly being adapted to receive a fluid through its open end and distribute it through the slots formed between the spaced wires which are on the said other side of said assembly.

7. A method of producing a scallop-shaped elongated screen assembly comprising the steps of contacting the opposed sides of a cylindrical screen assembly between a pair of elongated plates whose forming surfaces which contact the screen assembly have radii of curvature which are different from each other and are both greater than the radii of curvature of the cylindrical screen assembly; and moving said pair of plates into proximate contact with each other to deform said cylindrical screen assembly and produce a screen assembly which has a pair of elongated convex surfaces joined at their edges by curved surfaces which have a relatively small radius of curvature which is substantially less than that of the cylindrical screen assembly.

8. A method in accordance with claim 7 in which said screen assembly is provided with an internal flow distribution member by performing the additional step of inserting a perforated sheet metal cylinder inside said cylindrical screen assembly before said contacting step.

* * * * *